Dec. 13, 1960   J. A. DRUMMOND   2,964,392
CONTROL OF CARBON BLACK CHARACTERISTICS
Filed Nov. 12, 1957
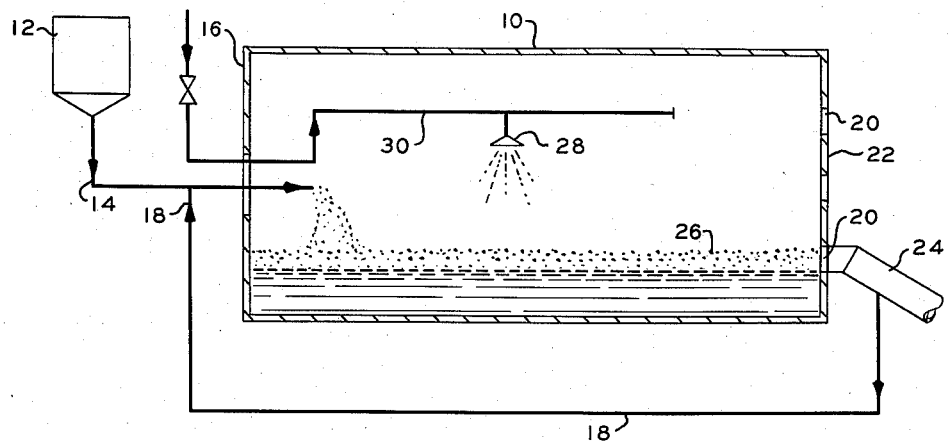
INVENTOR.
J.A. DRUMMOND
BY *Hudson & Young*
ATTORNEYS 2,964,392
Patented Dec. 13, 1960

2,964,392

CONTROL OF CARBON BLACK CHARACTERISTICS

John A. Drummond, Borger, Tex., assignor to Phillips Petroleum Company, a corporation of Delaware Filed Nov. 12, 1957, Ser. No. 695,500

9 Claims. (Cl. 23—314)

This invention relates to a process for controlling carbon black characteristics. A specific aspect of the invention is concerned with controlling carbon black characteristics during the pelleting of hot carbon black.

Carbon black from carbon black plants, as originally collected, is in the form of a dry flocculent powder of about 3 to 5 pounds per cubic foot density. It is customary to subject the flocculent black to agitation, either dry or wet, in order to compact the black and form the same into small granules or pellets. One conventional method comprises collecting the hot black from several furnaces in a common collecting zone and feeding the hot black to a series of pelleting mills in the form of elongated cylindrical drums rotating on their horizontal axes. These drums are conventionally of a length in the range of about 36 to 50 feet and of a diameter in the range of about 5 to 10 feet. The black is fed into one end (head) of the mill and because of the rotation of the mill and tumbling agitation of the black therein in the presence of seed pellets, the black is converted substantially completely to dense pellets as it passes to the delivery end (foot) of the mill. A certain proportion of the pellets are recycled to the head of the mill.

It has been found that the temperature of the black as it passes through the mill, due to the friction therein, increases appreciably so that in such a dry pelleting process the effluent pellets are often at a temperature in the range of 300 to 400° F. In order to reduce the temperature of the effluent pellets and protect the composition conveyor belts downstream from excessive heating, the spraying of water onto the pellet bed such as in a section at about the midpoint of the mill has been found practical. I have discovered that this practice of spraying water onto the hot pellets effects the carbon black characteristics such as photelometer, modulus, and abrasion index, and that the locus in the mill at which the carbon black is contacted with water has a definite effect on the characteristics of the carbon black as determined on the effluent pellets from the mill.

Accordingly, it is an object of the invention to provide a process for controlling the characteristics of carbon black. Another object is to provide a process for simultaneously pelleting carbon black and controlling certain characteristics thereof within limited ranges. Another object of the invention is to provide a process for controlling the modulus and photelometer of carbon black. Other objects will become apparent upon consideration of the accompanying disclosure.

The broadest aspect of the invention comprises varying the properties of carbon black which is in the form of hot pellets in a slowly moving bed wherein aqueous liquid is sprayed onto a restricted transverse section of the bed by varying the locus of the restricted section along the length of the bed. The invention is particularly applicable to a process wherein warm or hot carbon black from one or more carbon black furnaces is continuously passed into the head of an elongated cylindrical tumbling drum rotating on a generally horizontal axis and compacted pellets are continuously removed from the foot of the mill. In the manufacture of Philblack "O" the average photelometer of the black from a number of furnaces is in the range of about 88 to 90. Other types of black made by other processes have photelometers of other values depending upon the particular reaction conditions under which the black is made, the type of raw material utilized, etc. The photelometer of Philblack "O" can be raised to a value as high as 98 to 99 by varying the locus in the mill of contacting the black with water or other aqueous liquid. It has been found that the closer to the foot of the mill the water is sprayed, the higher the photelometer of the black as it emerges from the mill and the lower the modulus. If a low photelometer and high modulus are desired, the aqueous liquid should be sprayed onto the carbon black close to the head or feed end of the mill and where these characteristics are to be reversed in value the water should be sprayed near the foot of the mill. In some applications of carbon black in industry, a photelometer and modulus in the middle of the possible range is more desirable and this type of carbon black can be produced in pelleted form by spraying the aqueous liquid onto the bed of pellets near the mid-section of the mill. It is feasible to regulate the spray locus on the bed of pellets anywhere between the head and foot of the mill in order to obtain the desired carbon black characteristics for any specific utility within the ranges possible with the type of mill and pelleting conditions being employed. The application of Oliver K. Austin, S.N. 386,585, filed October 16, 1953, entitled "Water Spray in Pellet Mills," illustrates the type of pelleting wherein water is sprayed onto the pellet bed to reduce the temperature of the effluent pellets in order to protect the conveyor belts and improve pellet quality.

In another type of pelleting illustrated in the patent to Barbour, U.S. 2,758,039 (August 7, 1956), the pelleting is effected in the same manner as described heretofore without the spraying of water onto the pellets during the dry pelleting process. After the pellets are formed, they are passed to a second drum rotated on a slightly tilted axis and water is sprayed in a fine spray onto the pellet bed in this second drum and the pellets are then passed to a rotary dryer for removing residual water. In the dry compacting or pelleting operation, the friction in the mill raises the temperature of the carbon black substantially and the effluent pellets from such a pelleting step are considerably above atmospheric temperature so that they are hot as they pass into the spray drum. The characteristics of the effluent carbon black from this spray drum can be controlled within limits by varying the transverse section of the pellet bed therein upon which the water is sprayed in a similar manner to that in which the carbon black characteristics are varied or controlled when spraying aqueous liquid onto the pellet bed in the original pelleting drum.

The term "hot" as applied to the pellets in the specification and claims is intended to mean pellets at a temperature above about 150° F. Frequently the temperature of the pellets in the pelleting drum, particularly where the feed to the drum is above atmospheric temperature such as 150° F. and higher, reaches the range of 300 to 400° F. without water spraying or other cooling in the mill.

In pelleting Philblack "O" where the black passed to the pelleting drum has a photelometer in the range of 87 to 91 the photelometer of the effluent black from the pelleting drum can be controlled in the range of about 93 to 98 and the modulus can be regulated in the range of about 1250 to 1380.

As disclosed in the Austin application, the amount of water sprayed on to the pellets may be varied in the range of about 4 to 24 pounds of water per 100 pounds of flocculent carbon black and substantially all of the water is evaporated from the pellets by the time they are recovered as product pellets from the foot of the mill. Of course, the flow rate of water may be greater but if the water content of the pellets egressing from the mill is above about one weight percent the pellets will have to be subjected to a drying step in order to meet usual specification grade.

In order to further illustrate the process of the invention, reference is made to the schematic drawing in which numeral 10 designates a horizontally elongated cylindrical pelleting mill which is rotatable on its horizontal axis in conventional manner by means not shown. Flocculent carbon black from a supply hopper 12 is delivered to a conveyor 14 leading into the feed end 16 of mill 10. Recycle pellets are also fed into the feed end of the mill from recycle line 18. The recycle pellets serve as nuclei for the pelleting process going on in the mill.

As the loose black and recycle pellets pass thru the mill during rotation thereof, the material is tumbled in the mill so as to convert the loose black into pellets which flow from the top section of the bed via outlet openings 20 in the delivery end 22 of the mill. The pelleted material passes thru conduit 24 to a product belt, not shown, for delivery to storage and/or packaging. A portion of the effluent pellets is passed via line 18 to the feed end of the mill as noted heretofore.

In order to improve the pelleting and control the photelometer of the pelleted black, water is sprayed onto the pellets on the surface of the bed 26 thru spray 28 which is connected with water line 30. Spray 28 is movable along water line 30 longitudinally of the mill in order to vary and control the photelometer of the black.

In operating in accordance with the invention, the photelometer of the effluent pellets is readily obtained in known manner in a few minutes so that control can be quickly effected by moving the water spray or sprays inside the mill to the required position. The step of determining the modulus of a rubber sample utilizing the carbon black requires 12 to 24 hours and this test can be made in such a period and any change desired in the modulus can be effected in the light of the effect on change of photelometer.

To illustrate the invention, in a plant in which 50,000 pounds of loose carbon black are fed per 24 hour day into a pellet mill 8 feet in diameter by 48 feet in length, along with recycle pellets in a 1:1 ratio, the photelometer of the black feed being in the range of 88 to 90 and the rate of spraying water being 14 g.p.h. at a section of the bed about 6 feet from the head of the mill, the phototelometer of the egressing black is 93±1 and the modulus is about 1361 with an effluent pellet temperature of about 180° F. and a moisture content of less than one weight percent. When the spray locus is moved to within 10 feet of the foot of the mill, the photelometer of the effluent black is 97±1 and the modulus is about 1269. The modulus in the first instance was the average of seven tests and that obtained in the second instance was the average of 17 tests.

Photelometer measurements are made by shaking 2 grams of carbon black product in 50 cc. of $CCl_4$, heating to boiling, filtering, and measuring with a photometer the light transmission thru the recovered solvent in the instrument cell. The value obtained is related as a percentage of the value obtained with pure $CCl_4$ in the cell and this percentage is the photelometer of the carbon black product, e.g., when the light transmission value of a given sample is 90% of the light transmission of the standard solvent, the photelometer of the product is 90.

Other solvents such as benzene, toluene, and xylene may be used but these give different values since the solubility of tars increases from $CCl_4$ to benzene, to toluene, to xylene.

Certain modifications of the invention will become apparent to those skilled in the art and the illustrative details disclosed are not to be construed as imposing unnecessary limitations on the invention.

I claim:

1. In a process wherein an aqueous liquid is sprayed onto a restricted transverse section of a hot bed of carbon black pellets at a rate in the range of about 4 to 26 pounds of liquid per 100 pounds of carbon black in an elongated tumbling drum rotating on a generally horizontal axis in which the pellets move gradually from the head to the foot of said drum: the method of varying the photelometer of said black comprising moving the point of injection of said liquid longitudinally in said drum so as to vary the locus of said restricted section along the length of said bed and vary the photelometer of said black.

2. The process of claim 1 wherein the photelometer of the effluent carbon black is determined and said point is adjusted to effect the deisred photelometer.

3. The process of claim 2 wherein the effect of said black on rubber modulus is determined and said point is adjusted to effect desired modulus and photelometer.

4. The process of claim 1 wherein said drum is in the range of about 36 to 50 feet long, the black passing into said drum has a photelometer in the range of about 87 to 91, and said point is adjusted to effect a photelometer in the range of about 93 to 98.

5. The process of claim 4 wherein said point is adjusted to effect a modulus in the range of about 1250 to 1380.

6. The process of claim 1 wherein the effect of effluent black on rubber modulus is determined and said point is adjusted to effect the desired modulus.

7. In a process comprising continuously passing hot flocculent carbon black from a carbon black furnace into one end of an elongated cylindrical pellet mill rotating about its axis in substantially horizontal position, whereby said black is formed into pellets as it passes thru said mill in a continuous bed; continuously recovering pellets from the opposite end of said mill; and spraying an aqueous liquid at a rate in the range of about 4 to 24 pounds of liquid per 100 pounds of flocculent black onto a restricted transverse section of said bed as said black passes thru said mill: the method of varying the photelometer of said black comprising moving the point of injection of said liquid longitudinally in said mill so as to vary the locus of said restricted section longitudinally of said mill and vary the photelometer of said black.

8. In a process wherein flocculent carbon black at a temperature in the range of 150° to 400° F. in a continuous stream from a series of furnaces to a series of pelleting mills in the form of rotating horizontally elongated cylindrical drums to form said black into a bed of pellets as it passes from the head of each mill to the foot thereof from which the pellets are recovered as product, and water is continuously sprayed at a rate in the range of about 4 to 24 pounds of liquid per 100 pounds of flocculent black onto a restricted transverse section of said bed of pellets in each mill: the method of varying the photelometer of effluent black comprising moving the point of injection of said liquid longitudinally in said drums so as to vary the locus of said transverse section along the length of each bed and vary the photelometer of said black.

9. The process of claim 8 wherein the average photelometer of the black from said furnaces is in the range of about 87 to 91, said bed is in the range of about 36 to 50 feet long, and said point is adjusted to effect a photelometer in the range of about 93 to 98 and vary the photelometer of said black.

References Cited in the file of this patent

UNITED STATES PATENTS

| 2,591,024 | Sweitzer | Apr. 1, 1952 |
| 2,758,039 | Barbour | Aug. 7, 1956 |

FOREIGN PATENTS

| 775,378 | Great Britain | May 22, 1957 |

UNITED STATES PATENT OFFICE
CERTIFICATION OF CORRECTION

Patent No. 2,964,392                          December 13, 1960

John A. Drummond

It is hereby certified that error appears in the above numbered patent requiring correction and that the said Letters Patent should read as corrected below.

Column 4, line 17, for "deisred" read -- desired --; line 47, after "F." insert -- is passed --.

Signed and sealed this 18th day of July 1961.

(SEAL)
Attest:

ERNEST W. SWIDER
Attesting Officer

DAVID L. LADD
Commissioner of Patents